3,454,574
NOVEL HALO-SUBSTITUTED TETRAHYDRO-
QUINAZOLINES
Johannes Keck and Josef Nickl, Biberach (Riss), Friedrich-Wilhelm Koss, Misburg, and Eckhard Schraven and Gerwin Beisenherz, Biberach (Riss), Germany, assignors to Boehringer Ingelheim G.m.b.H., Ingelheim (Rhine), Germany, a corporation of Germany
No Drawing. Filed Apr. 10, 1967, Ser. No. 629,417
Claims priority, application Germany, Apr. 20, 1966,
T 30,948
Int. Cl. C07d 51/48; A61k 27/00
U.S. Cl. 260—251                                         8 Claims

ABSTRACT OF THE DISCLOSURE

The compounds are derivatives of halo-substituted tetrahydro-quinazolines useful as antipyretics, antitussives and secretolytics.

---

This invention relates to novel halo-substituted tetrahydro-quinazolines and acid addition salts thereof, as well as to various methods of preparing these compounds.

More particularly, the present invention relates to halo-substituted tetrahydro-quinazoline derivatives of the formula

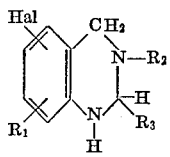

(I)

wherein

Hal is chlorine or bromine,
$R_1$ is hydrogen, chlorine or bromine,
$R_2$ is straight or branched lower alkyl, hydroxyalkyl, alkoxyalkyl, dialkylamino-alkyl, cycloalkyl, hydroxycycloalkyl, pyridyl-alkyl or aralkyl, and
$R_3$ is hydrogen, alkyl or aryl, and their non-toxic, pharmacologically acceptable acid addition salts.

The compounds of the Formula I above may be prepared by a number of different methods, among which the following have proved to be most convenient and efficient.

METHOD A

For the preparation of a compound of the Formula I wherein $R_3$ is hydrogen, by reacting a 2-amino-halo-benzylamine of the formula

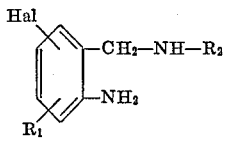

(II)

wherein Hal, $R_1$ and $R_2$ have the same meanings as in Formula I, or a salt thereof, with formaldehyde.

The reaction is preferably carried out in the presence of a solvent, such as a lower alkanol or a mixture of a lower alkanol with water, and at a temperature up to and including the boiling point of the particular solvent medium which is employed.

METHOD B

By reducing a dihydro-quinazoline or quinazolinone compound of the formula

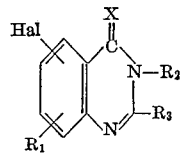

(III)

wherein X represents two hydrogen atoms or an oxygen atom, and Hal, $R_1$, $R_2$ and $R_3$ have the same meanings as in Formula I, with a metal hydride, such as lithium aluminum hydride.

The reduction reaction is most advantageously carried out in the presence of an inert organic solvent, such as ether or tetrahydrofuran, and it generally proceeds particularly rapidly at the boiling point of the particular solvent which is employed. After the reduction reaction has gone to completion, the excess metal hydride is decomposed and the reaction product is isolated pursuant to customary procedures.

METHOD C

For the preparation of a compound of the Formula I wherein $R_1$ is chlorine or bromine and $R_3$ is hydrogen or alkyl, by chlorinating or brominating a 1,2,3,4-tetrahydroquinazoline of the formula

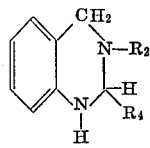

(IV)

wherein $R_2$ has the same meanings as in Formula I and $R_4$ is hydrogen or alkyl, with chlorine or bromine. The halogenation reaction is carried out pursuant to customary procedures and advantageously in the presence of an inert organic solvent, especially glacial acetic acid or chloroform.

METHOD D

For the preparation of a compound of the Formula I wherein $R_3$ is hydrogen, by reducing a quinazolinone compound of the formula

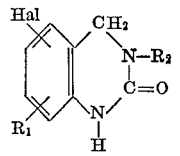

(V)

wherein Hal, $R_1$ and $R_2$ have the same meanings as in Formula I, with a metal hydride, preferably lithium aluminum hydride.

The reduction reaction is advantageously carried out in the presence of an inert organic solvent, such as ether, and at a temperature up to and including the boiling point of the particular solvent medium which is employed. After the reaction has gone to completion, the excess metal hydride is decomposed, for instance, with aqueous ethyl acetate and a small amount of sodium hydroxide, and the reaction product is isolated, for example, by extraction with chloroform.

The compounds of the Formula I which are obtained by Methods A through D pursuant to the present invention are organic bases and, therefore, form acid addition salts with one or two mol equivalents of an inorganic or organic acid. Examples of non-toxic, pharmacologically acceptable acid addition salts include, but are not limited to, those formed with hydrochloric acid, hydrobromic acid, sulfuric acid, phosphoric acid, lactic acid, citric acid, tartaric acid, maleic acid, oxalic acid or 8-chloro-theophylline. Such non-toxic acid addition salts may readily be obtained by dissolving the free base in a suitable solvent, and acidifying the solution with the desired acid.

The starting compounds for Methods A through D are either described in the literature or may be prepared by well known processes.

For instance, a 2-amino-halo-benzylamine of the Formula II may be obtained by the processes described in German Auslegeschrift 1,211,207.

A quinazolinone of the Formula III (X=O) may be obtained, for example, by the process described by B. R. Baker et al. in J. Org. Chem. 17, 48 (1952) which comprises subjecting an anthranilic acid amide to a ring closure reaction with a carboxylic acid under dehydrating conditions. Another method is described by E. Marchetti et al. in Ann. Chim. (Rome) 52, 836 (1962), which comprises reacting 2-methyl-1,3-benzoxazine-4-one with an amine and cyclizing the intermediate product formed thereby with the aid of a dehydrating agent.

A dihydroquinazoline of the Formula III $$\left(X=\begin{matrix}H\\H\end{matrix}\right)$$

may be prepared, for instance, by reacting a halo-substituted 2-acylamino-benzyl bromide with a primary amine in the presence of an inert solvent, such as ethanol, or by cyclizing acylation of a 2-amino-benzylamine with a carboxylic acid, as described by Gabriel et al. in Berichte 37, 3643 (1904); or by reducing an N-acyl-2-nitro-benzylamine, whereupon the N-acyl-2-amino-benzylamine formed thereby spontaneously undergoes ring closure, as described by Gabriel et al. in Berichte 23, 2807 (1890) and Berichte 24, 3091 (1891).

A 1,2,3,4-tetrahydro-quinazoline of the Formula IV may be prepared by the process described under Method A above, that is, by reacting an o-amino-benzylamine with formaldehyde.

Finally, a starting compound of the Formula V may be prepared by reacting a 2-amino-halo-benzylamine of the Formula II with phosgene. The reaction is preferably carried out in the presence of an inert organic solvent, especially an aromatic hydrocarbon, such as xylene or toluene, and at a temperature up to and including the boiling point of the particular solvent, preferably between 50 and 100° C.

In those instances where Methods A through D above yield a racemic mixture of the end product, such a racemate may subsequently be separated into its optically active antipodes in customary fashion; for example, by fractional crystallization with an optically active acid. In those cases where diastereomeric mixtures are obtained, these may be resolved into their components by chromatographic methods, for example.

The following examples further illustrate the present invention and will enable others skilled in the art to understand it more completely. It should be understood, however, that the invention is not limited solely to the particular examples given below.

EXAMPLE 1

Preparation of 6,8-dibromo-3-(trans-p-hydroxy-cyclohexyl)-1,2,3,4-tetrahydro-quinazoline hydrochloride by Method A 1.5 gm. of N - (trans-p-hydroxy-cyclohexyl) - N-(2-amino-3,5-dibromo-benzyl)-ammonium chloride were dissolved in 20 cc. of methanol, 4 cc. of an aqueous 40% formaldehyde solution were added thereto, and the mixture was refluxed for two hours. Thereafter, the reaction solutiton was allowed to cool, and then a small amount of ether was added thereto. The solid substance which crystallized out was collected and recrystallized from a mixture of methanol and ether. The product had a melting point of 219–221° C. (decomposition) and was identified to be the trans-stereoisomer of 6,8-dibromo-3-(p-hydroxy-cyclohexyl) - 1,2,3,4 - tetrahydroquinazoline hydrochloride of the formula

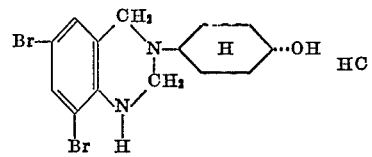

EXAMPLE 2

Preparation of 3-cyclohexyl-6,8-dibromo-1,2,3,4-tetrahydroquinazoline and its hydrochloride by Method D (a) 3-cyclohexyl-6,8-dibromo-1,2,3,4-tetrahydroquinazolin-2-one.—1.2 gm. of N-cyclohexyl-(2-amino-3,5-dibromobenzyl)-ammonium chloride were admixed with 0.9 gm. of triethylamine and 50 cc. of absolute toluene, and the mixture was allowed to stand for one hour. Thereafter, 5.7 gm. of a 4.6% phosgene solution in absolute toluene were added, and the mixture was heated at 70° C. for two hours. The reaction mixture was then allowed to cool; the triethyl-ammonium chloride precipitated thereby was separated by vacuum filtration, and the filtrate was extracted three times with 50 cc. portions of water. The toluene phase was then dried over sodium sulfate, evaporated in a water aspirator vacuum, and the residue was recrystallized from ethanol, yielding 3-cyclohexyl-6,8-dibromo - 1,2,3,4 - tetrahydro-quinazolin-2-one, M.P. 147–152° C.

(b) 3 - cyclohexyl - 6,8 - dibromo - 1,2,3,4 - tetrahydro-quinazoline and its hydrochloride.—0.3 gm. of pulverized lithium aluminum hydride was suspended in a small amount of absolute ether, the resulting suspension was slowly admixed with a solution of 1 gm. of 3-cyclohexyl-6,8-dibromo-1,2,3,4-tetrahydroquinazolin-2-one (the product obtained in (a) above) in 100 cc. of absolute ether, and the mixture was refluxed for three hours. Thereafter, the excess unreacted lithium aluminum hydride in the reaction mixture was decomposed with ethylacetate, water and 5 N sodium hydroxide, the ether phase was separated and the inorganic phase was extracted with chloroform. The chloroform extract solution was combined with the ether phase, dried over sodium sulfate and evaporated. The residue was recrystallized from aqueous ethanol, whereby a small amount of starting material initially separated out, which was filtered off. The filtrate was evaporated, and the residue, raw 3-cyclohexyl-6,8-dibromo-1,2,3,4-tetrahydroquinazoline, was dissolved in ethyl acetate. Gaseous hydrogen chloride was passed through the resulting solution, whereby a solid substance crystallized out which was collected and recrystallized from a mixture of methanol and ethyl acetate. The product had a melting point of 246–248° C. (decomposition) and was identified to be 3-cyclohexyl-6,8-dibromo-1,2,3,4-tetrahydro-quinazoline hydrochloride of the formula

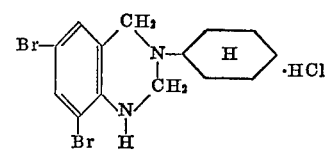

EXAMPLE 3

Preparation of 7-chloro-2-methyl-3-n-propyl-1,2,3,4-tetrahydro-quinazoline and its hydrochloride by Method B A solution of 7.3 gm. of 7-chloro-2-methyl-3-n-propyl-3,4-dihydro-quinazoline (M.P. of its hydrochloride=271–272° C.) in 60 cc. of absolute tetrahydrofuran was added, while stirring, to a suspension of 1.25 gm. of lithium aluminum hydride in 100 cc. of absolute tetrahydrofuran; the mixture was refluxed for three hours and was thereafter allowed to stand at room temperature overnight. Subsequently, the unreacted lithium aluminum hydride in the reaction mixture was decomposed by adding first ethyl acetate, then 1.2 cc. of water, then 1.2 cc. of 2 N sodium hydroxide and then again 3.6 cc. of water. The insoluble inorganic matter formed thereby was separated by vacuum filtration, the filtrate was evaporated, and the residue was taken up in a mixture of ether and water. The ether phase was separated, washed with water and evaporated. The residue, 7-chloro-2-methyl-3-n-propyl-1,2,3,4-tetrahydro-quinazoline, was dissolved in alcohol and the solution was admixed with anhydrous ethanolic hydrochloric acid until it was just acid. Upon cooling, a solid substance crystallized out which had a melting point of 179–180° C. and was identified to be 2-methyl-3-n-propyl-7-chloro-1,2,3,4-tetrahydro-quinazoline of the formula

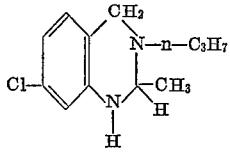

EXAMPLE 4

Preparation of 3-cyclohexyl-6,8-dibromo-1,2,3,4-tetrahydro-quinazoline and its hydrochloride by Method C 4.2 gm. of 3-cyclohexyl-1,2,3,4-tetrahydro-quinazoline, M.P. 79–82° C., were dissolved in 15 cc. of glacial acetic acid, and the solution was admixed with a solution of 1.9 cc. of bromine in 15 cc. of glacial acetic acid. The crystalline substance which separated out after a short period of standing was separated by vacuum filtration, and the filter cake was washed with glacial acetic acid. The washed filter cake was admixed with sodium hydroxide, whereby 3 - cyclohexyl - 6,8 - dibromo - 1,2,3,4 - tetrahydro - quinazoline was obtained, whose hydrochloride had the same melting point of 246–248° C. (decomposition) as the end product of Example 2(b).

EXAMPLE 5

Preparation of 3-cyclohexyl-6-chloro-1,2,3,4-tetrahydro-quinazoline and its hydrochloride by Method B A solution of 10 gm. of 3-cyclohexyl-6-chloro-3,4-dihydro-quinazolin-4-one in absolute tetrahydrofuran was added dropwise over a period of two hours, while stirring, to a boiling suspension of 4.5 gm. of lithium aluminum hydride in 100 cc. of absolute tetrahydrofuran. After all of the solution of the quinazolinone compound had been added, the reaction mixture was boiled for one hour more, and then the unreacted lithium aluminum hydride in the reaction mixture was decomposed by adding glacial acetic acid thereto. Thereafter, 4.5 cc. of water, 4.5 cc. of 2 N sodium hydroxide and again 14 cc. of water were added, the inorganic hydroxide precipitated thereby was separated by vacuum filtration, and the filtrate was evaporated to dryness. The residue was dissolved in cyclohexane, whereby a crystalline precipitate was formed which was identified to be the side product 2-methylamino-5-chlorobenzoic acid cyclohexylamide, M.P. 181° C. The side product was separated by filtration, and the filtrate was again evaporated to dryness. The residue, 3-cyclohexyl-6-chloro-1,2,3,4-tetrahydro-quinazoline, was taken up in a mixture of 2 N hydrochloric acid and ether. The solid substance which crystallized out of the aqueous phase was collected and was purified by recrystallization from a mixture of ethanol and ether, yielding 3-cyclohexyl-6-chloro-1,2,3,4-tetrahydro-quinazoline hydrochloride, M.P. 180° C., of the formula

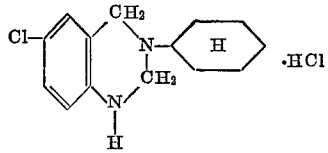

EXAMPLE 6

Using a procedure analogous to that described in Example 1, 3-(cis-m-hydroxy-cyclohexyl)-6,8-dibromo-1,2,3,4-tetrahydro-quinazoline was prepared from N-(cis-m-hydroxy - cyclohexyl) - N - (2 - amino - 3,5 - dibromo-benzyl)-ammonium chloride and formaldehyde.

Its hydrochloride had a melting point of 223.5–225° C. (decomposition).

EXAMPLE 7

Using a procedure analogous to that described in Example 1, 3-(trans-m-hydroxy-cyclohexyl)-6,8-dibromo-1,2,3,4-tetrahydro-quinazoline was prepared from N-(trans - m - hydroxy - cyclohexyl) - N - (2 - amino - 3,5-dibromo-benzyl)-ammonium chloride and formaldehyde.

Its hydrochloride had a melting point of 214–216° C. (decomposition).

EXAMPLE 8

Using a procedure analogous to that described in Example 1, 3-ethyl-6,8-dibromo-1,2,3,4-tetrahydro-quinazoline was prepared from N-ethyl-N-(2-amino-3,5-dibromo-benzyl)-ammonium bromide and formaldehyde.

Its hydrobromide had a melting point of 197–201° C.

EXAMPLE 9

Using a procedure analogous to that described in Example 1, 3-n-propyl-6,8-dibromo-1,2,3,4-tetdahydroquinazoline was prepared from N-n-propyl-N-(2-amino-3,5-dibromo-benzyl)-ammonium bromide and formaldehyde.

Its hydrobromide had a melting point of 197–200° C.

EXAMPLE 10

Using a procedure analogous to that described in Example 1, 3-isopropyl-6,8-dibromo-1,2,3,4-tetrahydroquinazoline was prepared from N-isopropyl-N-(2-amino-3,5-dibromo-benzyl)-ammonium bromide and formaldehyde.

Its hydrobromide had a melting point of 208–210° C.

EXAMPLE 11

Using a procedure analogous to that described in Example 1, 3-n-butyl-6,8-dibromo-1,2,3,4-tetrahydroquinazoazoline was prepared from N-n-propyl-N-(2-amino-3,5-dibromo-benzyl)-ammonium bromide and formaldehyde.

Its hydrobromide had a melting point of 208–210° C.

EXAMPLE 12

Using a procedure analogous to that described in Example 1, 3-isobutyl-6,8-dibromo-1,2,3,4-tetrahydroquinazoline was prepared from N-isobutyl-N-(2-amino-3,5-dibromo-benzyl)-ammonium bromide and formaldehyde.

Its hydrobromide had a melting point of 198–199° C.

EXAMPLE 13

Using a procedure analogous to that described in Example 1, 3-isobutyl-6,8-dibromo-1,2,3,4-tetrahydroquinazoline was prepared from N-isobutyl-N-(2-amino-3,5-dibromo-benzyl)-ammonium bromide and formaldehyde.

Its hydrobromide had a melting point of 206–207° C.

EXAMPLE 14

Using a procedure analogous to that described in Example 1, 3-sec.butyl-6,8-dibromo-1,2,3,4-tetrahydroquinazoline was prepared from N-sec.butyl-N-(2-amino-3,5-di-(2-amino-5-chloro-benzyl)-amine and formaldehyde in the presence of hydrochloric acid.

EXAMPLE 15

Using a procedure analogous to that described in Example 1, 3-isobutyl-6-chloro-1,2,3,4-tetrahydro-quinazoline was prepared from N-isobutyl-N-(2-amino-5-chlorobenzyl)-amine and formaldehyde in the presence of hydrochloric acid.

Its oxalate had a melting point 188–189° C.

EXAMPLE 16

Using a procedure analogous to that described in Example 1, 3-benzyl-6-chloro-1,2,3,4-tetrahydroquinazoline of the formula

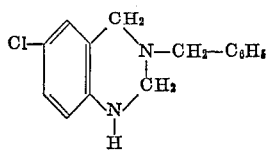

was prepared from N-benzyl-N-(2-amino-5-chloro-benzyl)-amine and formaldehyde in the presence of hydrochloric acid.

Its oxalate had a melting point of 180° C.

EXAMPLE 17

Using a procedure analogous to that described in Example 3, 2-methyl-3-ethyl-7-chloro-1,2,3,4-tetrahydroquinazoline was prepared from 2-methyl-3-ethyl-7-chloro-3,4-dihydro-quinazoline (melting point of hydrochloride=280–281° C.).

The melting point of the hydrochloride of the tetrahydroquinazoline compound was 173–176° C.

EXAMPLE 18

Using a procedure analogous to that described in Example 1, 3-(γ-methoxy-n-propyl)-6,8-dibromo-1,2,3,4-tetrahydro-quinazoline of the formula

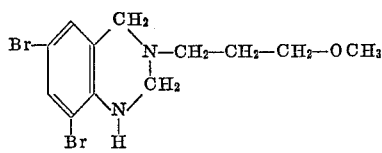

Its hydrobromide had a melting point of 169–173° C.

EXAMPLE 19

Using a procedure analogous to that described in Example 1, 3-(β-hydroxy-ethyl)-6,8-dibromo-1,2,3,4-tetrahydro-quinazoline of the formula

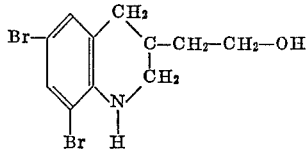

was prepared from N-(β-hydroxy-ethyl)-N-(2-amino-3,5-dibromo-benzyl)-ammonium bromide and formaldehyde.

Its hydrobromide had a melting point of 175°–180° C. (decomposition).

EXAMPLE 20

Using a procedure analogous to that described in Example 1, 3-(β-N,N-diethylamino-ethyl)-6,8-dibromo-1,2,3,4-tetrahydro-quinazoline of the formula

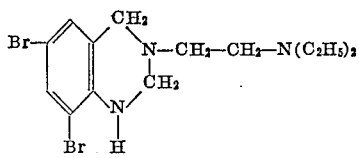

was prepared from (N-(β-N',N'-diethylamino-ethyl)-N-(2-amino-3,5-dibromo-benzyl)-ammonium tartrate and formaldehyde.

Its dihydrochloride had a melting point of 217–219.5° C. (decomposition).

EXAMPLE 21

Using a procedure analogous to that described in Example 1, 3-(γ-N,N-diethylamino-n-propyl)-6,8-dibromo-1,2,3,4-tetrahydro-quinazoline was prepared from N-(γ-N',N'-diethylamino-n-propyl)-N-(2-amino-3,5-dibromo-benzyl)-ammonium oxalate and formaldehyde.

Its dioxalate had a melting point of 177.5–179° C. (decomposition).

EXAMPLE 22

Using a procedure analogous to that described in Example 1, 3-α-picolyl-6,8-dibromo-1,2,3,4-tetrahydroquinazoline of the formula

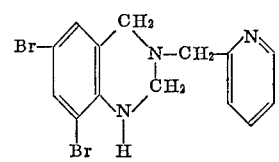

was prepared from N-(2-amino-3,5-dibromo-benzyl)-N-α-picolylammonium chloride and formaldehyde.

Its hydrochloride had a melting point of 189–192° C. (decomposition).

The compounds according to the present invention, that is, those embraced by Formula I above and their non-toxic, pharmacologically acceptable acid addition salts, have useful pharmacodynamic properties. More particularly, they exhiibt antipyretic, antitussive and secretolytic activities in warm-blooded animals. By "secretolytic" we mean the effect of increasing bronchial secretion.

For pharmaceutical purposes the compounds of the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, capsules, wafers, solutions, suspensions, emulsions, syrups, suppositories and the like. One dosage unit of the compounds according to the present invention is from 0.03 to 1 mgm./kg. body weight, and the daily dose is from 0.2 to 2 mgm./kg. body weight.

The following examples illustrate a few dosage unit compositions comprising a compound of the instant invention as an active ingredient. The parts are parts by weight unless otherwise specified.

EXAMPLE 23

Drop solution

The solution is compounded from the following ingredients:

| | Parts |
|---|---|
| 3-(trans-p-hydroxy-cyclohexyl)-6,8-dibromo-1,2,3,4-tetraquinazoline | 0.33 |
| p-Hhydroxy-benzoic acid methyl ester | 0.07 |
| p-Hydroxy-benzoic acid propyl ester | 0.03 |
| Polyvinylpyrrolidone | 5.00 |
| Distilled water | 95.57 |
| Total | 101.00 |

Compounding procedure.—The distilled water is heated to 80° C., and the p-hydroxy-benzoic acid esters, the polyvinylpyrrolidone and the tetrahydro-quinazoline compound are successively dissolved therein. The resulting solution is cooled to room temperature and is then filtered until free from suspended particles. 20 drops of the solution (about 1.2 cc.) contain 4 mgm. of the tetrahydro-quinazoline compound.

EXAMPLE 24

Cough syrup

The syrup is compounded from the following ingredients

| | Parts |
|---|---|
| 3-(cis-m-hydroxy-cyclohexyl)-6,8-dibromo-1,2,3,4-tetrahydroquinazoline | 0.08 |
| Sodium benzoate | 0.2 |
| Ammonium chloride | 0.7 |
| Sugar | 65.0 |
| Certified food color | 0.033 |
| Flavoring | 0.4 |
| Menthol | 0.015 |
| Ethanol | 4.0 |
| Distilled water | 54.572 |
| Total | 125.0 |

Compounding procedure.—The sugar and the tetrahydroquinazoline compound are dissolved in 45.572 parts of warm distilled water, and the solution is cooled to room temperature (Solution A).

The sodium benzoate, the ammonium chloride and food color are dissolved in the remaining amount of distilled water (Solution B).

The menthol is dissolved in the ethanol (Solution C).

First Solution B and then Solution C are stirred into Solution A, and thereafter the flavoring is added to the mixed solution. The finished syrup is finally filtered until free from suspended particles. 10 cc. of the syrup contain 8 mgm. of the tetrahydroquinazoline compound.

EXAMPLE 25

Hypodermic solution

The solution is compounded from the following ingredients:

| | Parts |
|---|---|
| 3-benzyl-6-chloro-1,2,3,4-tetrahydro-quinazoline | 10.0 |
| Tartaric acid | 2.0 |
| Glucose | 90.0 |
| Distilled water, q.s. ad. 2000.0 parts by vol. | |

Compounding procedure.—A sufficient amount of distilled water is heated to 80° C., and the tartaric acid and the tetrahydroquinazoline compound are dissolved therein. The solution is cooled to room temperature, the glucose is dissolved therein, the remaining amount of distilled water is added, and the solution is filtered until free from suspended particles. The solution is then filled into white 2 cc. ampules which are sterilized at 120° C. for 20 minutes and sealed. Each ampule contains 10 mgm. of the tetrahydroquinazoline compound.

EXAMPLE 26

Coated pills

The pill cores are compounded from the following ingredients:

| | Parts |
|---|---|
| 3-cyclohexyl-6,8-dibromo-1,2,3,4-tetrahydro-quinazoline | 10.0 |
| Lactose | 60.0 |
| Potato starch | 35.0 |
| Soluble starch | 4.0 |
| Magnesium stearate | 1.0 |
| Total | 110.0 |

Compounding procedure.—The tetrahydroquinazoline compound, the lactose and the potato starch are thoroughly admixed with each other, the mixture is moistened with an aqueous 20% solution of the soluble starch, and the moist mass is forced through a 1 mm. mesh screen. The moist granulate obtained thereby is dried at 40° C., again passed through the screen, and then admixed with the magnesium stearate. The resulting mixture is pressed into 110 mgm. pill cores which are then coated with a thin shell consisting essentially of sugar and talcum. The finished pills are polished with beeswax. Each coated pill weighs approximately 170 mgm. and contains 10 mgm. of the tetrahydroquinazoline compound.

Although the above dosage unit examples illustrate only four specific compounds of the invention as active ingredients, it should be understood that any other compound embraced by Formula I or a non-toxic, pharmacologically acceptable acid addition salt thereof, may be substituted for the particular tetrahydroquinazoline compound in Examples 23 through 26. Moreover, the amount of active ingredient in these examples may be varied to achieve the dosage unit range set forth above, and the amounts and nature of the inert pharmaceutical carrier ingredients may be varied to meet particular requirements.

We claim:

1. A compound of the formula

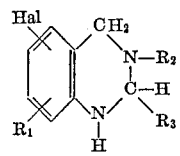

wherein
$R_1$ is a hydrogen or bromine,
$R_2$ is lower alkyl, hydroxy-lower alkyl, lower alkoxy-lower alkyl, (di-lower alkyl-amino)-lower alkyl, cyclohexyl, hydroxy-cyclohexyl, benzyl or pyridyl-lower alkyl,
$R_3$ is hydrogen or lower alkyl, and
Hal is chlorine or bromine,
or a non-toxic, pharmacologically acceptable acid addition salt thereof.

2. A compound of the formula

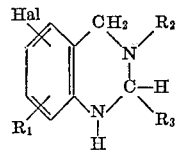

wherein
$R_1$ is hydrogen or bromine,
$R_2$ is alkyl of 1 to 4 carbon atoms, hydroxy-ethyl, methoxy-propyl, diethylamino-ethyl, diethylamino-propyl, cyclohexyl, hydroxy-cyclohexyl, benzyl or picolyl,
$R_3$ is hydrogen or methyl, and
Hal is chlorine or bromine,
or a non-toxic, pharmacologically acceptable acid addition salt thereof.

3. 3-(trans-p-hydroxy-cyclohexyl)-6,8-dibromo - 1,2,3,4-tetrahydro-quinazoline.

4. 3-(cis-m-hydroxy-cyclohexyl)-6,8-dibromo - 1,2,3,4-tetrahydro-quinazoline.

5. 3 - cyclohexyl - 6,8 - dibromo - 1,2,3,4 - tetrahydro-quinazoline.

6. 3-(trans-m-hydroxy-cyclohexyl)-6,8-dibromo - 1,2,3,4-tetrahydro-quinazoline.

7. 3 - isobutyl - 6,8 - dibromo - 1,2,3,4 - tetrahydro-quinazoline.

8. 3 - benzyl-6 - chloro-1,2,3,4 - tetrahydro-quinazoline.

No references cited.

ALEX MAZEL, *Primary Examiner.*

R. V. RUSH, *Assistant Examiner.*

U.S. Cl. X.R.

260—256.4; 424—80, 166, 251

PO-1050
(5/69)

UNITED STATES PATENT OFFICE
CERTIFICATE OF CORRECTION

Patent No. 3,454,574          Dated July 8, 1969

Inventor(s) JOHANNES KECK, JOSEF NICKL, FRIEDRICH-WILHELM KOSS, ECKHARD SCHRAVEN and GERWIN BEISENHERZ It is certified that error appears in the above-identified patent and that said Letters Patent are hereby corrected as shown below:

Column 4, first formula -- "HC" should read -- . HCl --
Column 6, line 46 - "208-210°C." should read --189-191°C.--;
          line 56 - "iso" should read --sec.--;
          line 57 - "iso" should read --sec.--;
          line 64 - "3-sec.butyl-6,8-dibromo" should read
                       --3-isopropyl-6-chloro--;
          line 65 - "azoline was prepared from N-sec.butyl-N-
                   2-amino-3,5-di-" should read
                   --azoline, m. p. 89-90°C., was prepared
                   from N-isopropyl-N- --.
Column 7, line 48 - "C-$CH_2$-$CH_2$-OH" should read --N-$CH_2$-$CH_2$-OH--
Column 8, line 60 - "tetraquinazoline" should read
                   --tetrahydroquinazoline--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents